United States Patent
Servera Serapio et al.

(10) Patent No.: US 7,392,118 B2
(45) Date of Patent: Jun. 24, 2008

(54) SYSTEM AND METHOD FOR MONITORING THE EXTERNAL ENVIRONMENT OF A MOTOR VEHICLE

(75) Inventors: Llorenc Servera Serapio, Barcelona (ES); Francesc Daura Luna, Barcelona (ES); Daniel Bande Martinez, Barcelona (ES)

(73) Assignee: Fico Mirrors, SA, Barcelona (ES)

( * ) Notice: Subject to any disclaimer, the term of this patent is extended or adjusted under 35 U.S.C. 154(b) by 378 days.

(21) Appl. No.: 10/534,444

(22) PCT Filed: Aug. 18, 2003

(86) PCT No.: PCT/ES03/00429

§ 371 (c)(1),
(2), (4) Date: May 10, 2005

(87) PCT Pub. No.: WO2005/017554

PCT Pub. Date: Feb. 24, 2005

(65) Prior Publication Data

US 2006/0111819 A1    May 25, 2006

(51) Int. Cl.
*G05D 1/00* (2006.01)
*G06F 7/00* (2006.01)

(52) U.S. Cl. .................. 701/28; 701/301; 340/435; 340/436

(58) Field of Classification Search .......... 701/1, 701/28, 300–302, 36; 340/425.5, 435–438; 342/70, 73

See application file for complete search history.

(56) References Cited

U.S. PATENT DOCUMENTS

| 5,285,523 | A  | 2/1994  | Takahashi       |
| 5,467,283 | A  | 11/1995 | Butsuen et al.  |
| 5,479,173 | A  | 12/1995 | Yoshioka et al. |
| 5,745,870 | A  | 4/1998  | Yamamoto et al. |
| 6,226,571 | B1 | 5/2001  | Kai             |

FOREIGN PATENT DOCUMENTS

| EP | 0 591 743 A1    | 4/1994 |
| WO | WO 01/61371 A2  | 8/2001 |

OTHER PUBLICATIONS

International Search Report for PCT/ES03/00429 mailed Jan. 8, 2004.

*Primary Examiner*—Yonel Beaulieu
(74) *Attorney, Agent, or Firm*—RatnerPrestia

(57) ABSTRACT

The system includes a capturing device for capturing information regarding presence from the exterior, representative of an object included within a supervisory area, which operates in combination with a device for detecting trajectories and a device for detecting inclinations of the vehicle, associated and in cooperation with an electronic system. The method includes using the proposed system to, by the generation of a chart that relates the trajectory and/or inclination with a corresponding supervisory area to be covered by the capturing device, vary the supervisory area depending on the trajectory and/or inclination of the vehicle, through the selection and execution of the appropriate actions, by the electronic system, which will depend on the type of capturing device used.

29 Claims, 2 Drawing Sheets

SYSTEM AND METHOD FOR MONITORING THE EXTERNAL ENVIRONMENT OF A MOTOR VEHICLE

This application is a U.S. National Phase Application of PCT International Application No. PCT/ES2003/000429, filed Aug. 18, 2003.

SCOPE OF INVENTION

The present invention relates to a system and method for the supervision of an exterior environment of a motor vehicle, in particular applicable to a rear view mirror. The system comprises a device for capturing information regarding presence from the exterior, representative of an object included within a supervisory area, which operates in combination with at least means for detecting trajectories, to vary said supervisory area depending on the trajectory of the vehicle.

BACKGROUND OF THE INVENTION

The existence of dead angles of vision for the driver of a motor vehicle represents a potential collision risk with other vehicles entering in said dead angles, which has not yet been solved in a satisfactory way by the vision offered by the rear view mirrors mounted in the vehicle. Therefore, different alternatives have arisen regarding the viewing to cover said dead angles, based on different technologies, some of which are used to cover zones very close to the vehicle and generally lateral zones, as the ones based on the detection of the distortion of the earth's magnetic field, and others are used for the detection of vehicles approaching said driver's vehicle, normally from behind, and from rather long distances, using in those cases different types of devices are needed, as for example electro-optical devices or radars. The operation of this type of devices, used for detecting vehicles approaching from rather long distances, is what is intended to be enhanced with the present invention.

The patent application EP-A-0591743 describes a device for detecting relative positions between vehicles, by means of an electro-optical sensor, preferably based on CCD technology, associated with a casing of a rear view mirror, and being said electro-optical sensor associated with an electronic processing unit connected to a central information system of the vehicle, to which it sends processed signals, providing finally warning signals. The aim of this device is to warn the driver of the vehicle where this device is installed, through various signals (acoustic, luminous, etc.), of the possible collision risk with an approaching vehicle. Furthermore, it is stated the possibility of using said device for warning the driver of the approaching vehicle of the possible collision risk, by means of the activation of the emergency lights of the vehicle, or of its direction indicators.

The patent application WO-A-01/61371 of the same applicant describes, furthermore, a device for detecting the presence of objects similar to the previous one, however, in said case the detection device consists of a receiver of electromagnetic waves and a photo sensor, which transforms the received electromagnetic waves into electric signals. In this document, special reference is made to the followed methodology when acquiring and processing the images, once digitized and previously amplified, as well as to the different calculation algorithms susceptible to be used for generating warning signals similar to the ones generated by the aforementioned device.

Even though the offered proposals represent a great step forward regarding conduction security, avoiding therewith a great number of risk situations for the occupants of a vehicle in which these devices are installed, however, it is also true that in many cases these devices turn out to be disturbing for said occupants, as the devices generate a large number of false alarms, provoked by normal driving situations without being dangerous, but which situations are interpreted wrongly and confounded with dangerous approaching of other vehicles. This happens due to the fact that, when designing said devices there has not been borne in mind the irregular circumstances through which the vehicle may go through in real driving situations, and the complexity of adapting said device to such circumstances.

U.S. Pat. No. 6,226,571 proposes a device for monitoring the environment of a vehicle, being able to predict a road's geography, as for example its curvature radius, only through the route information of a vehicle and a relative position. The proposed device includes a radar system for detecting the presence of objects around the vehicle and for supplying information about the position of the objects in a predetermined system of coordinates of detection, a vehicle identifying device to, starting from the detected objects, classify the objects that are vehicles and are driving on the road, distinguishing them from other types of objects. The device also includes a predictive device of the road's geography to predict it on the base of the position of the circulating vehicles and the route information according to an exit signal of the radar system and an exit signal of the vehicles identifying device. Even though the device proposed by said document, to the contrary of the previous ones, considers more closely a real driving situation, and combines a detection system similar to the previous ones, in this case a radar, with another type of sensors, such as speed sensors, driving angle sensors, etc., the stated applications are different to the ones proposed by the present invention, as in said patent one of the final targets is to predict as fast and realistic as possible the road or way's geography on which the vehicle is circulating, especially regarding its curvature radius. Therefore, even though it is possible to control the accelerator and the brake of the vehicle automatically, in order to maintain an appropriate distance to the preceding vehicle, on the base of the obtained information through the radar and said sensors, and, furthermore, to generate a warning signal if the situation is dangerous, in said antecedent no reference is made at any moment to the use of the information regarding the road's geography in order to modify or adjust the detection area of the radar system, or even to enhance said detection in any way.

Therefore, it is necessary to cover the existing lacks in the state of the art regarding the operation of these kind of devices, bearing in mind the different circumstances a vehicle may go through in a real driving situation, adding to the system for detecting the presence of objects in a dead angle, another series of detecting devices of said circumstances, in order to enhance said detection of the presence of objects, and therefore avoid the undesired false alarms.

SHORT DESCRIPTION OF THE INVENTION

The present invention proposes a system and a method for the supervision of an exterior environment of a motor vehicle, in particular applicable to an exterior rear view mirror of said vehicle. Said system is adapted for the detection of the presence of objects susceptible to collide with the mentioned vehicle, in a determined supervisory area, covering at least one dead angle, and comprises, therefore, a capturing device, whether a passive one, as an electro-optical device, as for example a camera, or an active one, as for example a radar system, an infra-red rays system or an ultrasounds system. Said capturing device is suitable to acquire images or information samples regarding presence captured from the exterior, representative of an object included within said supervisory area, and an electronic system to treat and analyze signals obtained through the capturing device, and to generate exit signals as a function of the result of said analysis.

In order to avoid false detections and adapt the detection of presence of objects in the dead angle of the vehicle in a more realistic way, the proposed system also comprises means for detecting trajectories and means for detecting inclinations associated and cooperating with said electronic system to vary the effective supervisory area by the capturing device as a function of the signals, processed and analyzed, obtained through said detection devices, without being it necessary for the driver to worry about the fact, that a normal driving situation in relation to another vehicle, as for example when driving through a curve, could turn out to be considered as potentially dangerous by the system, increasing, therefore, the confidence given by the system.

The present invention also proposes a method through which, and using the above mentioned system, the variation of the supervisory area to be covered by the capturing device is carried out.

Said method comprises performing the detection of an object entering in said supervisory area, the obtaining of signals representative of said detection, the treatment, processing and analysis of said signals and the generation of exit signals as a result of said analysis. It further comprises performing, through said electronic system, in combination with means for detecting trajectories and means for detecting inclinations of the vehicle, the detection of possible variations in the trajectory and/or inclination of the vehicle and the treatment, processing and analysis of signals representative of said possible variations in the trajectory and/or inclination, the storage of values representative of said variations, forming with them a chart that relates the trajectory and/or inclination with a corresponding supervisory area to be covered by the capturing device, being said chart accessible by the electronic system and used by it, in order to, once known the exact circumstances the vehicle is going through in a determined moment, thanks to said detection means, carry out the necessary actions to vary the supervisory area to be covered by the capturing device, actions which will be different depending on the type of capturing device used.

SHORT DESCRIPTION OF THE FIGURES

The previous characteristics and advantages of the invention will be shown more clearly starting from the following description of a series of embodiments, some of which are illustrated in the enclosed figures and have to be taken in an illustrative, however, not limiting way.

DETAILED DESCRIPTION OF SOME EMBODIMENTS

According to the enclosed figures, the system proposed by the present invention is used for the supervision of an exterior environment of a vehicle, in particular applicable on a rear view mirror, being said system adapted for detecting the presence of objects susceptible to collide with said vehicle, within a determined supervisory area, covering at least one dead angle, and being the system of the type which comprises a capturing device 1 suitable to acquire images or information samples regarding presence captured from the exterior, representative of an object included within said supervisory area, and an electronic system 4 (see FIG. 4) comprising at least one system for processing and analyzing first signals obtained by the mentioned capturing device 1, and which generates exit signals as a function of the result of said analysis, which may be used to warn the driver of the presence of an object within the supervisory area, through luminous, acoustic, etc. signals, or even, in a more active way to avoid an abrupt maneuver by the driver, making the steering wheel vibrate (or increasing its resistance torque) during this situation, as an example, or making it more difficult for the occupant to exit the vehicle by a partial blocking of the vehicle's doors or indicating him which door is better to use for exiting the vehicle to avoid a dangerous situation and, therefore, a possible drive over.

The present inventors have stated that in a real driving situation, there will arise false detections if the supervisory area is maintained straight and detections of real situations of risk will be missed. To avoid such defects and increase the systems' effectiveness, adapting the detection of the presence of objects in a more realistic way in the dead angle of the vehicle, the system comprises, furthermore, means for detecting trajectories 2 and, advantageously and in combination with it, means for detecting inclinations 3 of the vehicle, associated and in cooperation with said electronic system 4 to vary or adjust the supervisory area to be covered by the capturing device 1 as a function of second and third signals, processed and analyzed, obtained through said means for detecting trajectories 2 and/or said means for detecting inclinations 3.

Figure 1:
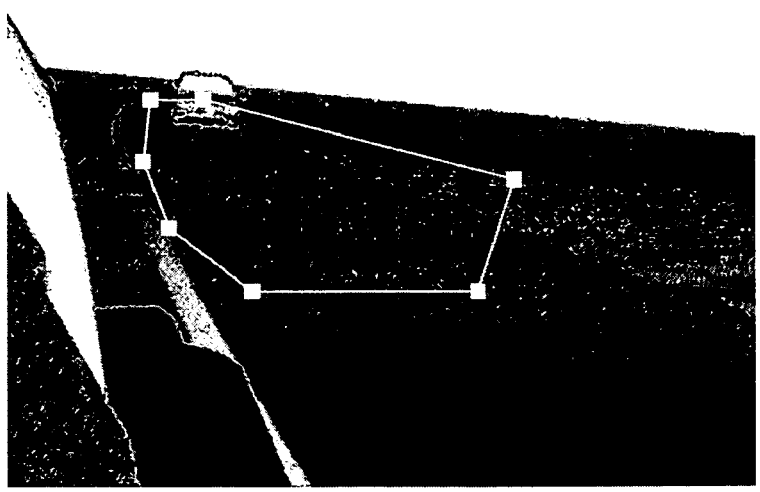
FIG. 1 shows a real driving situation showing the area to be covered by the capturing device for a trajectory to be followed by both vehicles, the one with the system object of the present invention installed, and the one which is intended to be detected, with a relatively large curvature radius.
Figure 2:
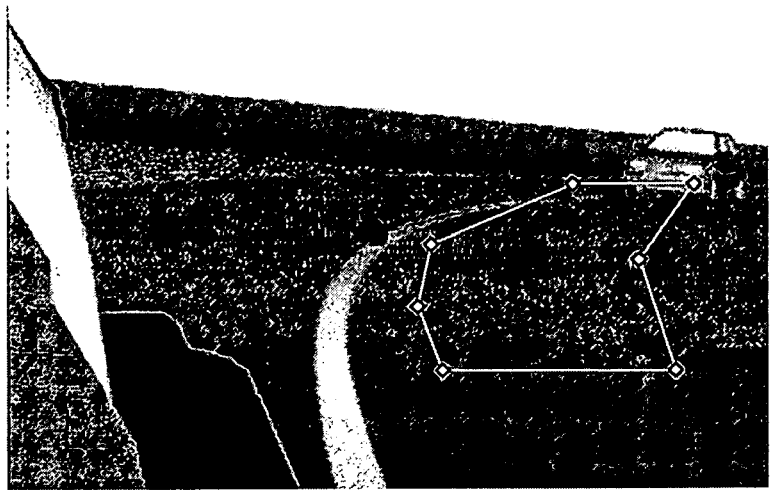
FIG. 2 shows another real driving situation with a very inferior curvature radius to the one shown in FIG. 1 and a consequently very different detection area.

All this may be better observed when having a look at FIGS. 1 and 2, where two of said real driving situations may be seen, both representative of the trajectory of the vehicle in a left curve, however, in FIG. 2 with a much lower curvature radius than in FIG. 1. In both figures the area which has to be covered by the capturing device 1 is shown, which, as is may be seen, is very different in one case compared to the other, what gives the idea of, if for example one would try to detect the vehicle trying to overtake in FIG. 2 covering the area shown in FIG. 1, it could easily escape from said detection, however, this problem is solved by adapting the area to any particular case.

Figure 4:
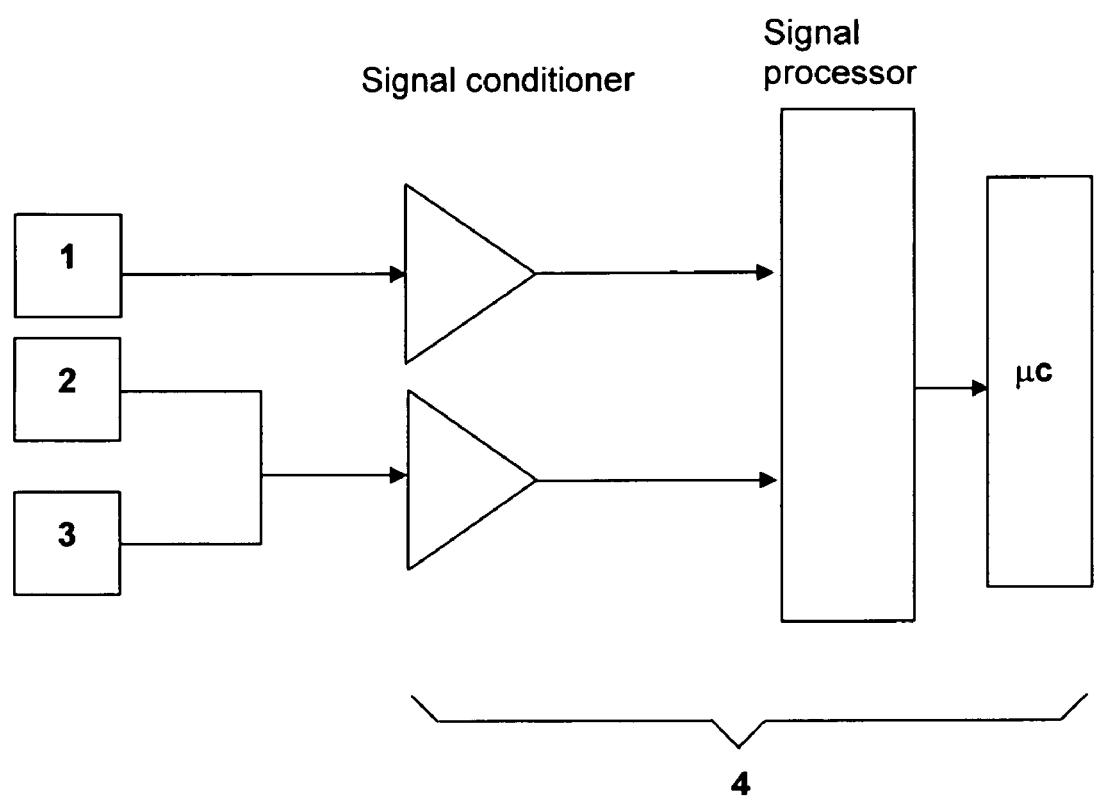
FIG. 4 shows a possible implementation of the system proposed by the present invention, as a scheme for an embodiment.

In FIG. 4 a scheme of all the parts pertaining to the system and detailed above may be observed. The figure shows capturing device 1 as well as the means for detecting trajectories 2 and the means for detecting inclinations 3. One may also observe, at a very schematic level, the electronic system 4, which in the figure consists basically of a signal conditioner, a signal processor and a microcontroller, even though, as it is obvious, this is just an example to be taken as indication and not as representation.

Figure 3:
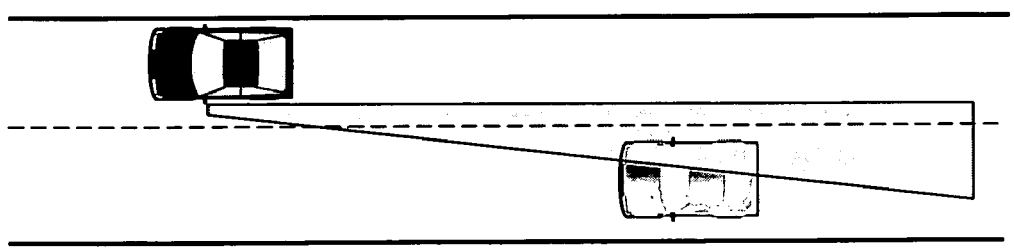
FIG. 3 shows a driving situation where a vehicle, which tries to overtake the vehicle with the system object of the present invention installed, enters an area covered by the capturing device, for a straight trajectory.

FIG. 3 shows how a vehicle, in a straight trajectory, when trying to overtake the vehicle in which the system proposed by the present invention is installed, enters in the area covered by the capturing device 1, being, therefore, detected by the system.

Obviously, the situation shown in FIG. 3 is not the one occurring in 100% of the cases of real driving situations, as the trajectory normally is variable, including curves, irregularities of the road, etc.

The invention provides different embodiments to find out the trajectory of the vehicle, depending on how the information regarding said trajectory is obtained. In a first embodiment the means for detecting trajectories 2 comprise at least one accelerometer or centripetal acceleration sensor, by means of which its centripetal acceleration is measured, providing the sensor an electrical signal to the electronic system 4, proportional to said centripetal acceleration, what allows that the electronic system 4, which could be part of a central control system of the vehicle, as for example a board computer, and which also has access to the information indicating the lineal speed of the vehicle, can obtain, at any moment and by means of both parameters, the angular speed of the vehicle and the curvature radius, as when making a turn a centripetal acceleration inversely proportional to the curvature radius and proportional to the square of the lineal speed is generated.

Said turning radius could also be obtained in another way, as according to the proposal in another embodiment, in which the accelerometer mentioned in the previous embodiment is here substituted by means for the acquisition of data from a pulsating system for turn sensing, consisting of two sensors located each one in one of both rear wheels of the vehicle. Said sensors provide electrical signals in form of impulses to the electronic system 4, proportional to the turn of each wheel, being different in case one wheel turns more than the other, i.e., in case the vehicle is turning. The difference between the impulse number between one wheel and the other is considered by the electronic system 4 in order to, as it happened in the case where an accelerometer was used as a sensor, obtain a series of values of curvature radius corresponding to the different trajectories adopted by the vehicle, as a function of the different curve types, apart from knowing when the vehicle is really turning.

In another embodiment the information about the turn radius of the vehicle is obtained by at least one device for turn detection located in the steering wheel of the vehicle, being part of the means for detecting trajectories 2. This information is treated in the same way as the already explained for the both above mentioned embodiments.

As for the means for detecting inclinations 3 is concerned, which are responsible for detecting the inclination and/or vibrations that the vehicle may suffer, which may be important, specially, on mountain roads or in zones where the roads are deteriorated or deformed, they comprise in a preferred embodiment at least a two axis accelerometer, which may be used not only for measuring the inclination of the vehicle, but also its trajectory, i.e., that, in fact, said two axis accelerometer would substitute the one used by the means for detecting trajectories 2 and would be part of both detection means 2 and 3.

The same function carried out by the two axis accelerometer could be executed, for another embodiment, by using at least one gyroscope.

Until now, there has been talked about the capturing device 1 in a very general way, without specifying what it consists of. This has been this way, because it could be any, for different embodiments, of the ones included in a group comprising, for example, a camera, an infra-red rays system, a radar system and an ultrasound system, or a combination of them.

In case the capturing device 1 is a camera, it could be part of the means for detecting trajectories 2, providing the electronic system 4 with signals representative of the images captured by itself and analyzing the electronic system the difference between consecutive images to calculate, for example, the turn radius of a curve, taking as a reference a part of the image which would also vary its position in case of a curve, such as a limiting line of the traffic lane, along which the vehicle is circulating. In a preferred embodiment the camera is mobile, what would extend the visual area to be covered by it.

In another embodiment said capturing device 1 is a radar system which comprises at least two antennas with different inclinations or one antenna which comprises at least two combined antennas with different inclinations, or fractal antenna. The emission may be executed by all or only some of the antennas included in the system. The number of antennas through which it will be emitted, as well as its election and the emission power, is selected by the electronic system 4.

Another embodiment incorporates, as capturing device 1, an infra-red rays system, which comprises at least one emitter and at least one receiver, the election and/or emission power of which will be selected by the electronic system 4.

In another embodiment the capturing device 1 is an ultrasound system, which covers at least one emitter and at least one receiver, being the selection of them and/or their emission power carried out by the electronic system 4.

A combination of the mentioned systems is possible, as it has already been mentioned before, covering in this way a bigger zone or supervisory area by the capturing device 1. An example for said combination could be the use of a camera to cover a zone belonging to the dead angle of the vehicle and relatively close to it (15 meters approximately), together with a radar system, whose detection distance could be of up to 100 or 200 meters, complementing both systems each other, to make easier and make more reliable the detection of vehicles trying to overtake.

The present invention also proposes a method for the supervision of an exterior environment of a vehicle, destined to the detection of the presence of objects susceptible to collide with said vehicle, within a determined supervisory area, covering at least one dead angle, which uses the proposed system for performing said detection in a reliable and realistic way, adapted to the circumstances the vehicle goes through.

The method comprises performing, through a system that integrates the already explained capturing device 1 and electronic system 4, the detection of the entry of an object in said supervisory area, the obtaining of signals representative of said detection, the treatment, processing and analysis of said signals and the generation of exit signals as a result of said analysis. The method further comprises performing, through said, already explained, electronic system 4 and the means for detecting trajectories 2 and the means for detecting inclinations 3 of the vehicle, the detection of possible variations in the trajectory and/or inclination of the vehicle, and the treatment, processing, and analysis of signals representative of said possible variations, in order to vary the supervisory area to be covered by the capturing device 1.

For each of the possible trajectories and/or inclination positions adopted by the vehicle, after said treatment, processing and analysis of said signals representative of the possible variations in the trajectory and/or inclination of the vehicle, the method comprises the storage, by means of the electronic system 4, of values representative of said variations, forming said values as a whole a chart that relates the trajectory and/or inclination with a corresponding supervisory area to be covered by the capturing device 1, being said chart accessible by the electronic system 4 and used by it in order to vary the supervisory area to be covered by the capturing device 1.

Once generated said chart, what could be done in a previous calibration step carrying out all type of test with the vehicle regarding all possible circumstances, it is recorded in a memory accessible for and/or belonging to the electronic system 4. With said chart as a reference, when in a real driving situation the vehicle goes through any of the contemplated circumstances, for example, when the vehicle is driving along a curve of a determined radius, the electronic system 4 will notice it thanks to the fact that the devices belonging to the means for detecting trajectories 2 and/or the means for detecting inclinations 3 of the vehicle, which were already explained when the system used by the present method was detailed, will inform the electronic system 4 that said circumstance is being produced and the system itself will be the one responsible for calculating a value of a variable characteristic of said circumstance, such as the curvature radius in case we are talking about a curve, or the inclination degree when the road along which the vehicle is circulating has a slope. Once known said value of, for example, the curvature radius, the electronic system 4 will consult the chart and select the corresponding value of the supervisory area to be covered by the capturing device 1. With the obtained value from said consultation the electronic system 4 will carry out the necessary actions to warrant that the capturing device 1 really covers the supervisory area obtained through the chart.

Said actions will depend on the system used as capturing device 1. The method is valid independently from the type of capturing device 1 used, which will consist at least of one member of a group including a camera, an infra-red rays system, a radar system and an ultrasound system, or a combination of them. For any of them a series of different actions are considered to be carried out by the electronic system 4, which, if more than one system of the previous ones are combined, will also be combinable.

In a preferred embodiment the method comprises using a camera as capturing device 1, and varying the supervisory area of the capturing device 1, through the electronic system 4, varying horizontal and vertical coordinates of a series of points, which as a whole will delimit said area or window. In FIGS. 1 and 2 two samples of said windows may be observed regarding two different driving situations, in particular, two curves with a different curvature radius.

Said camera could be mobile, in which case the variation of the supervisory area of the capturing device 1, through the electronic system 4, would be executed, whether by varying said horizontal and vertical coordinates of a series of points, which as a whole will delimit said area, or by moving said mobile camera, or both things at a time, being this way a much larger variation possible.

The method also considers the possibility of using at least part of the information acquired by the camera to detect the changes along the trajectory of the vehicle, through the analysis of said information by the electronic system 4, as it has been mentioned previously when explaining the system object of the present invention.

In another embodiment, the method comprises using a radar system as capturing device 1, with at least two antennas with different inclinations or a radar system with one antenna which comprises at least two antennas with different inclinations, of fractal antennas, and varying the supervisory area of the capturing device 1, through the electronic system 4, choosing the antenna through which to emit and/or varying its emission power.

Another alternative considered by the method is the use of an infra-red rays system or an ultrasound system, with at least one emitter and one receiver as capturing device 1, and the variation of the supervisory area of the capturing device 1, through the electronic system 4, choosing the emitter through which to emit and/or varying its emission power.

A person skilled in the art could introduce changes and modifications in the described embodiments, without departing from the scope of the invention as defined in the attached claims.

The invention claimed is:

1. System for the supervision of an exterior environment of a motor vehicle, installable in an exterior rear view mirror, being said system adapted for detecting the presence of objects susceptible to collide with said vehicle, within a determined supervisory area, covering at least one dead angle, and the system comprising:
   a capturing device suitable to acquire images or information samples regarding presence captured from the exterior, representative of an object included in said supervisory area,
   an electronic system which comprises at least a system for processing and analyzing first input signals obtained through said capturing device, and which generates exit signals as a function of the result of said analysis, said exit signals being warning signals,
   means for detecting trajectories for the detection of possible variations in the trajectory of the vehicle, associated and in cooperation with said electronic system to vary said supervisory area to be covered by the capturing device as a function of second signals, processed and analyzed, obtained by said means for detecting trajectories.

2. System according to claim 1, wherein further comprising means for detecting inclinations of said vehicle, associated and in cooperation with said electronic system to vary the supervisory area to be covered by the capturing device as a function of said second signals and of third signals, processed and analyzed, obtained by said means for detecting inclinations.

3. System according to claim 1, wherein said means for detecting trajectories comprise at least one accelerometer.

4. System according to claim 1, wherein said means for detecting trajectories comprise at least means for the acquisition of data from a pulsating system for turn sensing, located in at least one wheel of the vehicle.

5. System according to claim 1, wherein said means for detecting trajectories comprise at least one device for turn detection, located in the steering wheel of the vehicle.

6. System according to claim 2, wherein said means for detecting trajectories and said means for detecting inclinations comprise at least one two axis accelerometer.

7. System according to claim 2, wherein said means for detecting trajectories and said means for detecting inclinations comprise at least one gyroscope.

8. System according to claim 1, wherein said capturing device comprises at least one of i) a camera, ii) an infra-red rays system, iii) a radar system and iv) an ultrasound system.

9. System according to claim 8, wherein said capturing device is a camera.

10. System according to claim 9, wherein said camera is mobile.

11. System according to claim 9, wherein said camera is part of said means for detecting trajectories.

12. System according to claim 8, wherein said capturing device is a radar system.

13. System according to claim 12, wherein said radar system comprises at least two antennas with different inclination.

14. System according to claim 12, wherein said radar system comprises an antenna that covers at least two combined antennas with different inclinations, or fractal antennas.

15. System according to claim 8, wherein said capturing device is an infra-red rays system.

16. System according to claim 15, wherein said infra-red rays system comprise at least one emitter and at least one receiver.

17. System according to claim 8, wherein said capturing device is an ultrasound system.

18. System according to claim 17, wherein said ultrasound system comprises at least one emitter and at least one receiver.

19. Method for the supervision of an exterior environment of a motor vehicle, for detecting the presence of objects susceptible to collide with said vehicle, within a determined supervisory area, covering at least one dead angle, of the type which, through a system which comprises a capturing device suitable to acquire images or information samples regarding presence captured from the exterior, representative of an object included within said supervisory area, and an electronic system, comprises the detection of the entry of an object in said supervisory area, the obtaining of first signals representative of said detection, treating, processing and analysis of said first signals and the generation of exit signals as a result of said analysis, said exit signals being warning signals, performing, by means of said electronic system and by at least means for detecting trajectories, the detection of possible variations in the trajectory of the vehicle and the treatment, processing and analysis of second signals representative of said possible variations in the trajectory, to vary the supervisory area to be covered by the capturing device.

20. Method according to claim 19, further comprising performing, by means of said electronic system and by at least means for detecting inclinations of the vehicle, the detection of possible variations in the inclination of the vehicle and treating, processing and analysis of third signals representative of said possible variations in the inclination of the vehicle, to vary the supervisory area to be covered by the capturing device, as a function of said second and third signals, treated and processed.

21. Method according to claim 20, wherein for each of the possible trajectories and/or each of the possible inclination positions adopted by the vehicle, after said treatment, processing and analysis of said signals representative of the possible variations in the trajectory and/or inclination of the vehicle, comprising the storage, by means of the electronic system, of representative values, forming the whole of said representative values a chart that relates the trajectory and/or inclination with a corresponding supervisory area to be covered by the capturing device, being said chart accessible for the electronic system and used by it to vary the supervisory area to be covered by the capturing device.

22. Method according to claim 21, further comprising using as the capturing device at least one of i) a camera, ii) an infra-red rays system, iii) a radar system and iv) an ultrasound system.

23. Method according to claim 22, further comprising using a camera as the capturing device, and varying the supervisory area of the capturing device, by means of the electronic system, varying vertical and horizontal coordinates of a series of points, which as a whole will delimit said area.

24. Method according to claim 22, further comprising using a mobile camera as the capturing device, and varying the supervisory area of the capturing device, by means of the electronic system, by varying vertical and horizontal coordinates of a series of points, which as a whole will delimit said area and/or by moving said mobile camera.

25. Method according to claim 23, further comprising using, by means of the electronic system, at least part of the information acquired by said camera for detecting changes in the trajectory of the vehicle.

26. Method according to claim 22, further comprising using a radar system as capturing device, with at least two antennas with different inclination or a radar system with one antenna which comprises at least two antennas with different inclination, or fractal antennas, and varying the supervisory area of the capturing device, by means of the electronic system, choosing the antenna through which to emit and/or varying its emission power.

27. Method according to claim 22, further comprising using an infra-red rays system with at least one emitter and at least one receiver as capturing device, and varying the supervisory area of the capturing device, by means of the electronic system, choosing the emitter through which to emit and/or varying its emission power.

28. Method according to claim 22, further comprising using an ultrasound system with at least one emitter and at least one receiver as capturing device, and varying the supervisory area of the capturing device, by means of the electronic system, choosing the emitter through which to emit and/or varying its emission power.

29. Method according to claim 24, further comprising using, by means of the electronic system, at least part of the information acquired by said camera for detecting changes in the trajectory of the vehicle.

* * * * *